(12) United States Patent
Viitanen

(10) Patent No.: US 9,088,225 B2
(45) Date of Patent: Jul. 21, 2015

(54) SWITCHING BRANCH FOR THREE-LEVEL CONVERTER AND METHOD FOR CONTROLLING SWITCHING BRANCH OF THREE-LEVEL CONVERTER

(75) Inventor: Tero Viitanen, Vantaa (FI)

(73) Assignee: ABB TECHNOLOGY OY, Helsinki (FI)

( * ) Notice: Subject to any disclaimer, the term of this patent is extended or adjusted under 35 U.S.C. 154(b) by 362 days.

(21) Appl. No.: 13/288,088

(22) Filed: Nov. 3, 2011

(65) Prior Publication Data

US 2012/0120698 A1 May 17, 2012

(30) Foreign Application Priority Data

Nov. 17, 2010 (EP) .................................. 10191467

(51) Int. Cl.
*H02M 7/487* (2007.01)
*H02M 7/00* (2006.01)
(52) U.S. Cl.
CPC .............. *H02M 7/487* (2013.01); *H02M 7/003* (2013.01)
(58) Field of Classification Search
CPC ....................................................... H02M 7/487
USPC ............................ 363/43, 126, 127, 131, 132
See application file for complete search history.

(56) References Cited

U.S. PATENT DOCUMENTS

| | | | | |
|---|---|---|---|---|
| 5,459,655 A | * | 10/1995 | Mori et al. ..................... | 363/132 |
| 5,929,519 A | | 7/1999 | Mori et al. | |
| 6,697,274 B2 | * | 2/2004 | Bernet et al. .................. | 363/132 |
| 8,130,523 B2 | * | 3/2012 | Benesch ........................ | 363/127 |

FOREIGN PATENT DOCUMENTS

| | | |
|---|---|---|
| CN | 201528281 U | 7/2010 |
| EP | 0533158 A2 | 3/1993 |

OTHER PUBLICATIONS

European Search Report issued on May 11, 2011, for European Application No. 10191467.9.
Thomas Brückner, The Active NPC Converter and Its Loss-Balancing Control, IEEE Transactions of Industrial Electronics, vol. 52, No. 3, Jun. 2005, pp. 855-868.
Notice of the First Office Action dated Nov. 5, 2013, issued in Chinese Patent Application No. 201110362369.3, and an English Translation of the Office Action. (15 pages).

* cited by examiner

*Primary Examiner* — Adolf Berhane
*Assistant Examiner* — Jye-June Lee
(74) *Attorney, Agent, or Firm* — Buchanan Ingersoll & Rooney PC

(57) ABSTRACT

Exemplary embodiments for controlling a switching branch for a three-level converter, and a switching branch are disclosed. A first semiconductor switch and a second semiconductor switch, a first diode and a second diode, a third semiconductor switch and a fourth semiconductor switch, a third diode, and a fourth diode, a fifth semiconductor switch and a sixth semiconductor switch, a fifth diode, and a sixth diode, and a control arrangement for controlling the semiconductor switches are provided. The first semiconductor switch, the first diode, the fifth semiconductor switch and the fifth diode reside in a first switching branch-specific semiconductor module, and the fourth semiconductor switch, the fourth diode, the sixth semiconductor switch and the sixth diode reside in a second switching branch-specific semiconductor module.

10 Claims, 3 Drawing Sheets

SWITCHING BRANCH FOR THREE-LEVEL CONVERTER AND METHOD FOR CONTROLLING SWITCHING BRANCH OF THREE-LEVEL CONVERTER

RELATED APPLICATION(S)

This application claims priority under 35 U.S.C. §119 to European Patent Application No. 10191467.9 filed in Europe on Nov. 17, 2010, the entire content of which is hereby incorporated by reference in its entirety.

FIELD

The disclosure relates to a converter, such as a switching branch for a three-level converter and a method for controlling a switching branch of a three-level converter.

BACKGROUND INFORMATION

Three-level converters are converters that have three DC poles. In addition to positive and negative DC poles, they have a neutral DC pole. Examples of three-level neutral-point-clamped converters including an example of an active three-level neutral-point-clamped converter are given in T. Brückner, S. Bernet and H. Güldner, "The Active NPC Converter and Its Loss-Balancing Control", IEEE transactions on industrial electronics, Vol. 52, No. 3, June 2005.

FIG. 1 shows an example of a switching branch of a three-level converter in accordance with a known implementation. The switching branch includes six diodes D1 to D6 and six controllable switches S1 to S6. A converter including one or more switching branches, like that of FIG. 1, can operate as a rectifier or as an inverter. The switches S1 to S6 are then controlled according to a modulation scheme used.

In a rectifier operation of the switching branch, when a current flows into the switching branch through an AC pole AC, the AC pole AC can be connected to a positive DC pole Udc+ via the first diode D1 and the second diode D2 and to a neutral DC pole NP either via the second diode D2 and the fifth switch S5 or via the third switch S3 and the sixth diode D6. Further in a rectifier operation of the switching branch, when a current flows out of the switching branch through the AC pole AC, a negative DC pole Udc− can be connected to the AC pole AC via the fourth diode D4 and the third diode D3 and the neutral DC pole NP can be connected to the AC pole AC either via the sixth switch S6 and the third diode D3 or via the fifth diode D5 and the second switch S2.

In an inverter operation of the switching branch, when a current flows into the switching branch through the AC pole AC, the AC pole AC can be connected to the negative DC pole Udc− via the third switch S3 and the fourth switch S4 and to the neutral DC pole NP either via the third switch S3 and the sixth diode D6 or via the second diode D2 and the fifth switch S5. Further in an inverter operation of the switching branch, when a current flows out of the switching branch through the AC pole AC, the positive DC pole Udc+ can be connected to the AC pole AC via the first switch S1 and the second switch S2 and the neutral DC pole NP can be connected to the AC pole AC either via the fifth diode D5 and the second switch S2 or via the sixth switch S6 and the third diode D3.

The switching branch of FIG. 1 can be implemented as one integrated power module that includes the diodes and controllable switches of the main circuit. Cooling optimization may then present a problem, e.g. because different components can have different specifications for cooling.

One solution to this problem is to distribute the loading to different components in order to distribute the power dissipation between the components. Thus, the connection between the neutral DC pole NP and the AC pole AC can be alternated between the alternative connection routes as described above.

SUMMARY

An exemplary switching branch for a three-level converter is disclosed, the switching branch comprising: a first semiconductor switch and a second semiconductor switch connected in series between a positive direct current pole and an alternating current pole of the switching branch; a first diode connected in parallel to the first semiconductor switch, and a second diode connected in parallel to the second semiconductor switch; a third semiconductor switch and a fourth semiconductor switch connected in series between a negative direct current pole and the alternating current pole of the switching branch; a third diode connected in parallel to the third semiconductor switch, and a fourth diode connected in parallel to the fourth semiconductor switch; a fifth semiconductor switch connected between a neutral direct current pole and a connection point between the first and second semiconductor switches; a sixth semiconductor switch connected between the neutral direct current pole and a connection point between the third and fourth semiconductor switches; a fifth diode connected in parallel to the fifth semiconductor switch, and a sixth diode connected in parallel to the sixth semiconductor switch; and a control arrangement for controlling the semiconductor switches, wherein the first semiconductor switch, the first diode, the fifth semiconductor switch and the fifth diode reside in a first switching branch-specific semiconductor module, wherein, the fourth semiconductor switch, the fourth diode, the sixth semiconductor switch and the sixth diode reside in a second switching branch-specific semiconductor module, and wherein the control arrangement is configured to perform at least one of: control each semiconductor switch, when the converter operates as a rectifier, such that when a current flows into the switching branch through the alternating current pole, said current flows through either the first diode or the fifth semiconductor switch, and such that when a current flows out of the switching branch through the alternating current pole, said current flows through either the fourth diode or the sixth semiconductor switch; and control a semiconductor switch, when the converter operates as an inverter, such that when a current flows into the switching branch through the alternating current pole, said current flows through either the sixth diode or the fourth semiconductor switch, and such that when a current flows out of the switching branch through the alternating current pole, said current flows through either the fifth diode or the first semiconductor switch.

An exemplary three-phase three-level converter is disclosed, comprising: three switching branches, wherein each switching branch includes: a first semiconductor switch and a second semiconductor switch connected in series between a positive direct current pole and an alternating current pole of the switching branch; a first diode connected in parallel to the first semiconductor switch, and a second diode connected in parallel to the second semiconductor switch; a third semiconductor switch and a fourth semiconductor switch connected in series between a negative direct current pole and the alternating current pole of the switching branch; a third diode connected in parallel to the third semiconductor switch, and a fourth diode connected in parallel to the fourth semiconductor switch; a fifth semiconductor switch connected between a neutral direct current pole and a connection point between the first and second semiconductor switches; a sixth semiconductor switch connected between the neutral direct current pole and a connection point between the third and fourth semiconductor switches; a fifth diode connected in parallel to the fifth semiconductor switch, and a sixth diode connected in parallel to the sixth semiconductor switch; and a control arrangement for controlling the semiconductor switches, wherein the first semiconductor switch, the first diode, the fifth semiconductor switch and the fifth diode reside in a first switching branch-specific semiconductor module, wherein, the fourth semiconductor switch, the fourth diode, the sixth semiconductor switch and the sixth diode reside in a second switching branch-specific semiconductor module, and wherein the control arrangement is configured to perform at least one of: control each semiconductor switch, when the converter operates as a rectifier, such that when a current flows into the switching branch through the alternating current pole, said current flows through either the first diode or the fifth semiconductor switch, and such that when a current flows out of the switching branch through the alternating current pole, said current flows through either the fourth diode or the sixth semiconductor switch; and control a semiconductor switch, when the converter operates as an inverter, such that when a current flows into the switching branch through the alternating current pole, said current flows through either the sixth diode or the fourth semiconductor switch, and such that when a current flows out of the switching branch through the alternating current pole, said current flows through either the fifth diode or the first semiconductor switch.

An exemplary method for controlling a switching branch of a three-level converter is disclosed, the switching branch comprising: a first semiconductor switch and a second semiconductor switch connected in series between a positive direct current pole and an alternating current pole of the switching branch; a first diode connected in parallel to the first semiconductor switch, and a second diode connected in parallel to the second semiconductor switch; a third semiconductor switch and a fourth semiconductor switch connected in series between a negative direct current pole and the alternating current pole of the switching branch; a third diode connected in parallel to the third semiconductor switch, and a fourth diode connected in parallel to the fourth semiconductor switch; a fifth semiconductor switch connected between a neutral direct current pole and a connection point between the first and second semiconductor switches; a sixth semiconductor switch connected between the neutral direct current pole and a connection point between the third and fourth semiconductor switches; and a fifth diode connected in parallel to the fifth semiconductor switch, and a sixth diode connected in parallel to the sixth semiconductor switch, wherein the first semiconductor switch, the first diode, the fifth semiconductor switch and the fifth diode reside in a first switching branch-specific semiconductor module; and the fourth semiconductor switch, and wherein the fourth diode, the sixth semiconductor switch and the sixth diode reside in a second switching branch-specific semiconductor module, the method comprising: controlling each semiconductor switch, when the converter operates as a rectifier, such that when a current flows into the switching branch through the alternating current pole, said current flows through either the first diode or the fifth semiconductor switch, and such that when a current flows out of the switching branch through the alternating current pole, said current flows through either the fourth diode or the sixth semiconductor switch.

An exemplary computer program product comprising computer program code recorded on a non-transitory computer readable medium is disclosed, wherein when the computer readable medium is in a computer execution of the program code causes the computer to carry out the steps of the method according to controlling a switching branch of a three-level converter, the switching branch comprising: a first semiconductor switch and a second semiconductor switch connected in series between a positive direct current pole and an alternating current pole of the switching branch; a first diode connected in parallel to the first semiconductor switch, and a second diode connected in parallel to the second semiconductor switch; a third semiconductor switch and a fourth semiconductor switch connected in series between a negative direct current pole and the alternating current pole of the switching branch; a third diode connected in parallel to the third semiconductor switch, and a fourth diode connected in parallel to the fourth semiconductor switch; a fifth semiconductor switch connected between a neutral direct current pole and a connection point between the first and second semiconductor switches; a sixth semiconductor switch connected between the neutral direct current pole and a connection point between the third and fourth semiconductor switches; and a fifth diode connected in parallel to the fifth semiconductor switch, and a sixth diode connected in parallel to the sixth semiconductor switch, wherein the first semiconductor switch, the first diode, the fifth semiconductor switch and the fifth diode reside in a first switching branch-specific semiconductor module; and the fourth semiconductor switch, and wherein the fourth diode, the sixth semiconductor switch and the sixth diode reside in a second switching branch-specific semiconductor module, the method comprising: controlling each semiconductor switch, when the converter operates as a rectifier, such that when a current flows into the switching branch through the alternating current pole, said current flows through either the first diode or the fifth semiconductor switch, and such that when a current flows out of the switching branch through the alternating current pole, said current flows through either the fourth diode or the sixth semiconductor switch.

An exemplary method for controlling a switching branch of a three-level converter is disclosed, the switching branch comprising: a first semiconductor switch and a second semiconductor switch connected in series between a positive direct current pole and an alternating current pole of the switching branch; a first diode connected in parallel to the first semiconductor switch, and a second diode connected in parallel to the second semiconductor switch; a third semiconductor switch and a fourth semiconductor switch connected in series between a negative direct current pole and the alternating current pole of the switching branch; a third diode connected in parallel to the third semiconductor switch, and a fourth diode connected in parallel to the fourth semiconductor switch; a fifth semiconductor switch connected between a neutral direct current pole and a connection point between the first and second semiconductor switches; a sixth semiconductor switch connected between the neutral direct current pole and a connection point between the third and fourth semiconductor switches; and a fifth diode connected in parallel to the fifth semiconductor switch, and a sixth diode connected in parallel to the sixth semiconductor switch, wherein the first semiconductor switch, the first diode, the fifth semiconductor switch and the fifth diode reside in a first switching branch-specific semiconductor module; and wherein the fourth semiconductor switch, the fourth diode, the sixth semiconductor switch and the sixth diode reside in a second switching branch-specific semiconductor module, the method comprising: controlling the semiconductor switches, when the converter operates as an inverter, such that when a current flows into the switching branch through the alternating current pole, said current flows through either the sixth diode or the fourth semiconductor switch, and such that when a current flows out of the switching branch through the alternating current pole, said current flows through either the fifth diode or the first semiconductor switch.

BRIEF DESCRIPTION OF THE DRAWINGS

The disclosure will now be explained in greater detail in connection with exemplary embodiments and with reference to the attached drawings, in which.

DETAILED DESCRIPTION

Exemplary embodiments of the present disclosure are based on the idea that the first semiconductor switch, the first diode, the fifth semiconductor switch and the fifth diode of the switching branch reside in a first switching branch-specific semiconductor module, and the fourth semiconductor switch, the fourth diode, the sixth semiconductor switch and the sixth diode of the switching branch reside in a second switching branch-specific semiconductor module. Exemplary embodiments of the present disclosure are further based on the idea that the semiconductor switches are controlled, when the converter operates as a rectifier, such that when a current flows into the switching branch through the alternating current pole, said current always flows through either the first diode or the fifth semiconductor switch, and such that when a current flows out of the switching branch through the alternating current pole, said current always flows through either the fourth diode or the sixth semiconductor switch. In addition to or alternatively, the semiconductor switches are controlled, when the converter operates as an inverter, such that when a current flows into the switching branch through the alternating current pole, said current always flows through either the sixth diode or the fourth semiconductor switch, and such that when a current flows out of the switching branch through the alternating current pole, said current always flows through either the fifth diode or the first semiconductor switch.

Exemplary embodiments of the present disclosure provide the advantage that the cooling of component entities residing in clearly separate modules can be optimized in comparison with one large integrated power module, in which all components are in the same shell. In addition, because semiconductors commutating with each other at a modulation frequency should reside physically within the same semiconductor module, it is possible to minimize the leakage inductance of the commutation current path and thus power surges caused by the leakage inductances. Consequently, additional losses and disturbances caused by such power surges are also minimized.

The implementation of the exemplary embodiments of the present disclosure are not restricted to any specific system, but can be applied to various electrical systems. In addition, the use of exemplary embodiments disclosed herein are not restricted to any system utilizing a specific basic frequency or to any specific voltage level.

Figure 1:
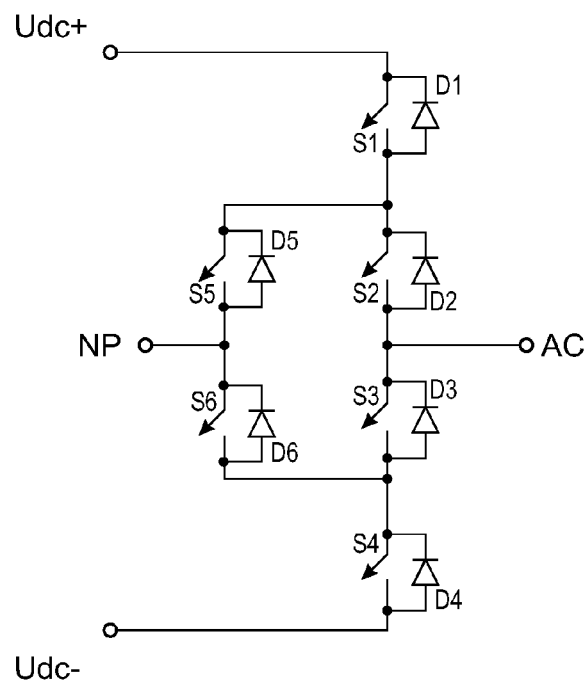
FIG. 1 shows a circuit diagram of a switching branch of a three-level converter in accordance with an embodiment of a known implementation.
Figure 2:
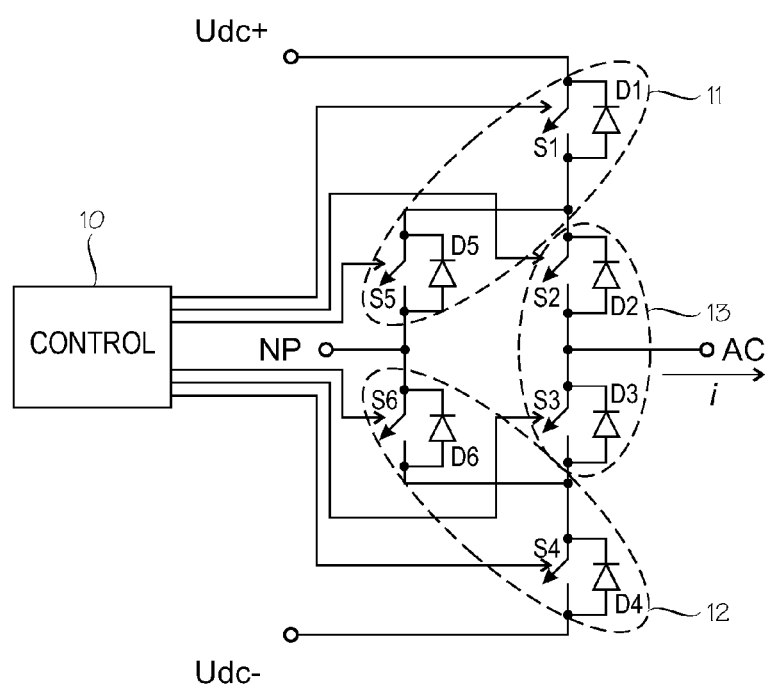
FIG. 2 shows a circuit diagram of a switching branch of a three-level converter in accordance with an exemplary embodiment.

FIG. 2 shows a circuit diagram of a switching branch of a three-level converter in accordance with an exemplary embodiment. It should be noted that the figure only presents elements essential to the understanding of the disclosure. The switching branch can be one switching branch of a multi-phase converter, such as a three-phase converter, or a switching branch of a one-phase converter, for example. Such a converter may operate as a rectifier and/or as an inverter.

As shown in FIG. 2, the switching branch includes an alternating current pole AC, a positive direct current pole Udc+, a negative direct current pole Udc−, and a neutral direct current pole NP. Further, the switching branch includes a first semiconductor switch S1 and a second semiconductor switch S2 connected in series between the positive direct current pole Udc+ and the alternating current pole AC of the switching branch. A first diode D1 is connected in parallel to the first semiconductor switch S1 and a second diode D2 is connected in parallel to the second semiconductor switch S2. Further, the switching branch includes a third semiconductor switch S3 and a fourth semiconductor switch S4 connected in series between the negative direct current pole Udc− and the alternating current pole AC of the switching branch. A third diode D3 is connected in parallel to the third semiconductor switch S3, and a fourth diode D4 is connected in parallel to the fourth semiconductor switch S4. Further, the switching branch includes a fifth semiconductor switch S5 connected between the neutral direct current pole NP and a connection point between the first semiconductor switch S1 and the second semiconductor switch S2, and a sixth semiconductor switch S6 connected between the neutral direct current pole NP and a connection point between the third semiconductor switch S3 and the fourth semiconductor switch S4. A fifth diode D5 is connected in parallel to the fifth semiconductor switch S5 and a sixth diode D6 is connected in parallel to the sixth semiconductor switch S6. The semiconductor switches S1 to S6 can be IGBTs (Insulated Gate Bipolar Transistor) or FETs (Field-Effect Transistor) or any corresponding semiconductor switches.

FIG. 2 also shows a control arrangement 10 via which the switches S1 to S6 can be controlled according to a certain modulation method. The disclosure is not, however, limited to any specific modulation method. The control of the semiconductor switches S1 to S6 can involve one or more additional control components (not shown). The switching branch configuration can also include an AC filter (not shown), which may be, for instance, of L-type or LCL-type, that is connected to the alternating current pole AC.

According to an embodiment, the first semiconductor switch S1, the first diode D1, the fifth semiconductor switch S5 and the fifth diode D5 reside in a first switching branch-specific semiconductor module 11, and the fourth semiconductor switch S4, the fourth diode D4, the sixth semiconductor switch S6 and the sixth diode D6 reside in a second switching branch-specific semiconductor module 12. In this context, the term 'semiconductor module' generally refers to a module that includes several semiconductor elements arranged on a common substrate and connected electrically to each other in a suitable manner. Furthermore, the second semiconductor switch S2, the second diode D2, the third semiconductor switch S3 and the third diode D3 can reside in a third switching branch-specific semiconductor module 13 as shown in FIG. 2.

Figure 3:
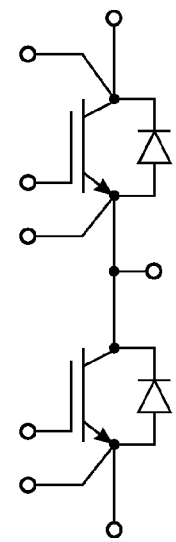
FIG. 3 shows an example of a semiconductor module structure in accordance with an exemplary embodiment.

FIG. 3 shows an example of a semiconductor module structure in accordance with an exemplary embodiment. The first switching branch-specific semiconductor module 11, the second switching branch-specific semiconductor module 12 and the third switching branch-specific semiconductor module 13 of FIG. 2 can be implemented in the exemplary semiconductor module structure of FIG. 3. An inverter branch module of FIG. 3 includes two semiconductor switches connected in series with a diode connected in parallel to each in the manner shown in the figure. By means of the semiconductor module structure described in FIG. 3 or a corresponding structure, the switching branch structure of FIG. 2 can be implemented without difficulty.

Figure 4:
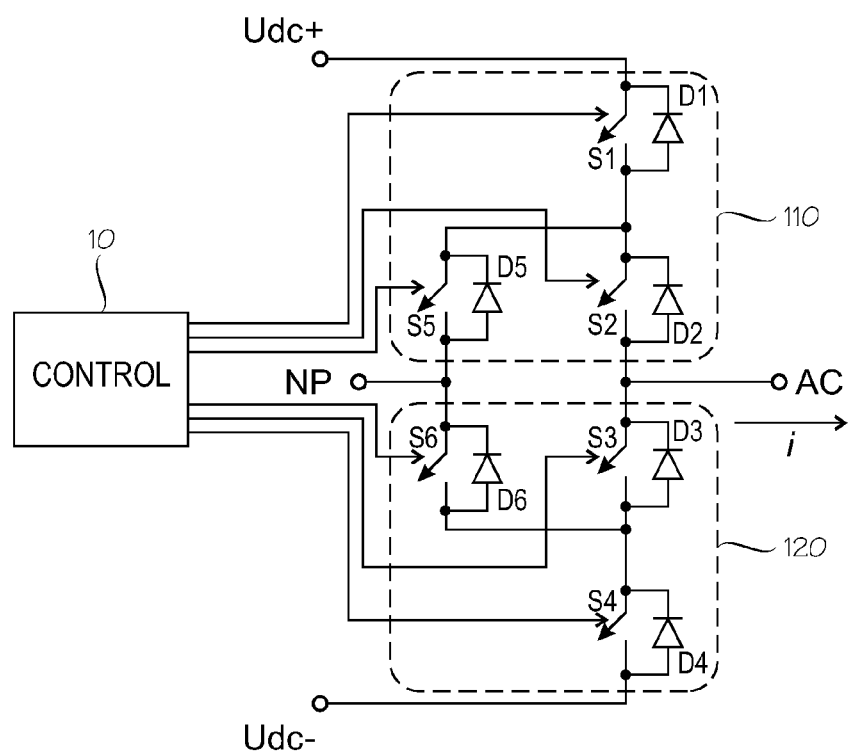
FIG. 4 shows a circuit diagram of a switching branch of a three-level converter in accordance with an exemplary embodiment.

In an exemplary embodiment of the present disclosure, the second semiconductor switch S2 and the second diode D2 reside in the first switching branch-specific semiconductor module, and the third semiconductor switch S3 and the third diode D3 reside in the second switching branch-specific semiconductor module. FIG. 4 shows a circuit diagram of a switching branch of a three-level converter in accordance with an exemplary embodiment. The exemplary switching branch of FIG. 4 corresponds to that of FIG. 2 with the exception that the second semiconductor switch S2 and the second diode D2 reside in the first switching branch-specific semiconductor module 110, and the third semiconductor switch S3 and the third diode D3 reside in the second switching branch-specific semiconductor module 120.

As mentioned above, a converter including one or more exemplary switching branches of the present disclosure can operate as a rectifier and/or as an inverter. The following table shows for both the rectifier and inverter operating modes current polarities and corresponding direct current poles that can be alternately connected to the alternating current pole AC according to the modulation scheme used:

| Operating mode | Rectifier | Inverter | Rectifier | Inverter |
| --- | --- | --- | --- | --- |
| Current polarity | + | + | − | − |
| AC commutation | Udc−/NP | Udc+/NP | Udc+/NP | Udc−/NP |

A positive (+) current polarity in the table refers to a situation in which a current i flows out of the switching branch through the alternating current pole AC, as illustrated by an arrow in FIGS. 2 and 4. A negative (−) current polarity, in turn, refers to a situation in which the current flows to the opposite direction, i.e. into the switching branch through the alternating current pole AC.

In another exemplary embodiment of the present disclosure, when the converter including one or more exemplary switching branches described above operates as a rectifier, the semiconductor switches S1 to S6 of the switching branch are controlled such that when a current flows into the switching branch through the alternating current pole AC, said current always flows through either the first diode D1 or the fifth semiconductor switch S5, and such that when a current flows out of the switching branch through the alternating current pole AC, said current always flows through either the fourth diode D4 or the sixth semiconductor switch S6. Alternatively, or in addition, when the converter including one or more exemplary switching branches described above operates as an inverter, the semiconductor switches S1 to S6 of the switching branch are controlled such that when a current flows into the switching branch through the alternating current pole AC, said current always flows through either the sixth diode D6 or the fourth semiconductor switch S4, and such that when a current flows out of the switching branch through the alternating current pole AC, said current always flows through either the fifth diode D5 or the first semiconductor switch S1. As a result of the above-described control, commutating semiconductors should be within the same semiconductor module when a current flowing through the alternating current pole AC has a certain polarity.

For example, when the converter operates as a rectifier, the first diode D1 and the fifth semiconductor switch S5 of the first semiconductor module 11, 110 commutate with each other when the current flows into the switching branch through the alternating current pole AC, and the fourth diode D4 and the sixth semiconductor switch S6 of the second semiconductor module 12, 120 commutate with each other when the current flows out of the switching branch through the alternating current pole AC. In a similar manner, when the converter operates as an inverter, the sixth diode D6 and the fourth semiconductor switch S4 of the first semiconductor module 11, 110 commutate with each other when the current flows into the switching branch through the alternating current pole AC, and the fifth diode D5 and the first semiconductor switch S1 of the second semiconductor module 12, 120 commutate with each other when the current flows out of the switching branch through the alternating current pole AC.

Further, in addition to the rectifier and inverter operating modes, an intermediate transition operating mode can exist for a situation where the operating mode changes between the rectifier and inverter operating modes. Then, during such a transition operating mode the commutation to and from the neutral direct current pole NP can be a mix of the rectifier and inverter operating modes described above. Such a transition operating mode period can take a much shorter time compared to the rectifier and inverter operating mode periods. The transition operating mode can take place via the neutral direct current pole NP commutation, which means that the mode transition between the rectifier and inverter operating modes can be established by changing a neutral direct current pole NP current path of the rectifier mode to a neutral direct current pole NP current path of the inverter mode and vice versa. It should be noted, however, that it is not relevant to the basic idea of the disclosure how the transition between the rectifier and inverter operating modes is implemented.

Figure 5:
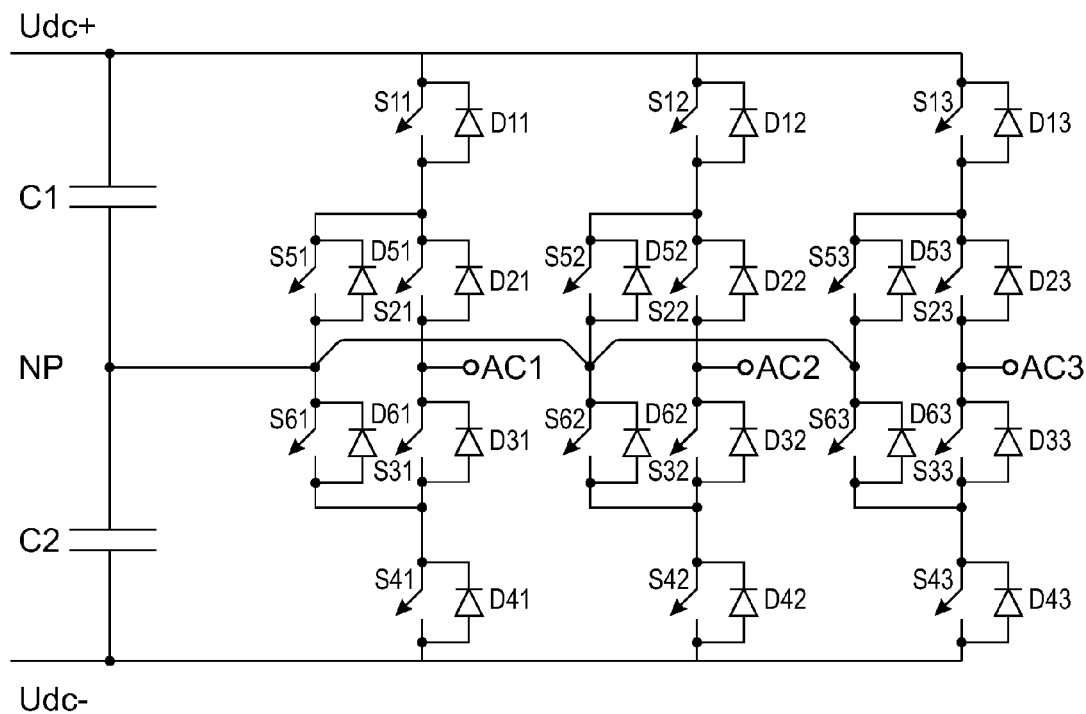
FIG. 5 shows a circuit diagram of the main circuit of a three-phase three-level converter in accordance with an exemplary embodiment.

In an exemplary embodiment of the present disclosure, a three-phase three-level converter can be implemented by connecting together three switching branches according to any embodiment described above. FIG. 5 shows a circuit diagram of the main circuit of a three-phase three-level converter in accordance with an exemplary embodiment. FIG. 5 illustrates an exemplary circuit diagram of a converter including three switching branches corresponding to that of FIG. 2 or 4. The three switching branches have been connected together by connecting the positive direct current poles Udc+ of each switching branch together, the negative direct current poles Udc− of each switching branch together, and the neutral direct current poles NP of each switching branch together. The figure shows only components necessary for understanding the disclosure. For the sake of clarity, FIG. 5 does not show the control arrangements for the semiconductor switches. The converter of FIG. 5 can function both as a rectifier and an inverter. It should be noted that the converter circuit configuration could differ from the one shown in FIG. 5 without deviating from the basic idea of the disclosure.

The exemplary three-phase converter includes three switching branches with alternating current poles AC1, AC2 and AC3, respectively. The converter configuration can also include an AC filter (not shown), which may be, for instance, of L-type or LCL-type, that is connected to the alternating current poles AC1, AC2 and AC3. Each switching branch comprises a first diode D11, D12, D13, a second diode D21, D22, D23, a third diode D31, D32, D33, a fourth diode D41, D42, D43, a fifth diode D51, D52, D53 and a sixth diode D61, D62, D63 connected as described above in connection with FIGS. 2 and 4. Each switching branch further includes a first semiconductor switch S11, S12, S13, a second semiconductor switch S21, S22, S23, a third semiconductor switch S31, S32, S33, a fourth semiconductor switch S41, S42, S43, a fifth semiconductor switch S51, S52, S53 and a sixth semiconductor switch S61, S62, S63 connected as described above in connection with FIGS. 2 and 4. The semiconductor switches S11 to S63 can be IGBTs (Insulated Gate Bipolar Transistor) or FETs (Field-Effect Transistor) or any corresponding semiconductor switches. The DC intermediate circuit of the exemplary converter of FIG. 5 can include capacitors C1 and C2 as illustrated. The structure of the intermediate circuit could also be different, depending on the circuit configuration used. The semiconductor switches S11 to S63 of each switching branch can be controlled in a manner similar to that described above.

The control of the semiconductor switches according to the exemplary embodiments described above can be performed by or via the control arrangement 10, which can also perform the normal modulation control of the switches. It is also possible to use additional or separate logical or physical units (not shown) for performing the control functionality of the disclosure. The functionality of the disclosure could, for example, be implemented using a separate logic arrangement, which could be independent of the normal modulation control of the switches, for example.

The control arrangement 10 and/or a separate logic arrangement controlling the semiconductor switches according to any one of the above embodiments, or a combination thereof, can be implemented as one unit or as two or more separate units that are configured to implement the functionality of the various embodiments. In the context of the present disclosure, the term 'unit' refers generally to a physical or logical entity, such as a physical device or a part thereof or a software routine. The control arrangement 10 according to any one of the embodiments can be implemented at least partly by means of one or more computers or corresponding digital signal processing (DSP) equipment provided with suitable software, for example. Such a computer or digital signal processing equipment can comprise at least a working memory (RAM) providing storage area for arithmetical operations, and a central processing unit (CPU), such as a general-purpose digital signal processor. The CPU can include a set of registers, an arithmetic logic unit, and a CPU control unit. The CPU control unit is controlled by a sequence of program instructions transferred to the CPU from the RAM. The CPU control unit can contain a number of microinstructions for basic operations. The implementation of microinstructions can vary depending on the CPU design. The program instructions can be coded by a programming language, which may be a high-level programming language, such as C, Java, etc., or a low-level programming language, such as a machine language, or an assembler. The computer can also have an operating system which may provide system services to a computer program written with the program instructions. The computer or other apparatus implementing the disclosed exemplary embodiments, or a part thereof, may further include suitable input means for receiving e.g. measurement and/or control data, and output means for outputting e.g. control data. It is also possible to use a specific integrated circuit or circuits, or discrete electric components and devices for implementing the functionality according to any one of the embodiments.

Exemplary embodiments of the present disclosure can be implemented in existing system elements or by using separate dedicated elements or devices in a centralized or distributed manner. Known converter switching branches or converters, for example, can include processors and memory that can be utilized in the functions according to exemplary embodiments of the disclosure. Thus, all modifications and configurations specified for implementing an embodiment of the disclosure e.g. in known converter switching branches or converters can be performed as software routines, which can be implemented as added or updated software routines. If at least part of the functionality of the disclosure is implemented by software, such software can be provided as a computer program product including computer program code which, when run on a computer, causes the computer or a corresponding arrangement to perform the functionality according to the exemplary embodiments described above. Such a computer program code can be stored or generally recorded on a computer readable medium, such as a suitable memory, e.g. a flash memory or an optical memory, from which it is loadable to the unit or units executing the program code. In addition, such a computer program code implementing the disclosure can be loaded to the unit or units executing the computer program code via a suitable data network, for example, and it may replace or update a possibly existing program code.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A switching branch for a three-level converter, the switching branch comprising:
    a first semiconductor switch and a second semiconductor switch connected in series between a positive direct current pole and an alternating current pole of the switching branch;
    a first diode connected in parallel to the first semiconductor switch, and a second diode connected in parallel to the second semiconductor switch;
    a third semiconductor switch and a fourth semiconductor switch connected in series between a negative direct current pole and the alternating current pole of the switching branch;
    a third diode connected in parallel to the third semiconductor switch, and a fourth diode connected in parallel to the fourth semiconductor switch;
    a fifth semiconductor switch connected between a neutral direct current pole and a connection point between the first and second semiconductor switches;
    a sixth semiconductor switch connected between the neutral direct current pole and a connection point between the third and fourth semiconductor switches;
    a fifth diode connected in parallel to the fifth semiconductor switch, and a sixth diode connected in parallel to the sixth semiconductor switch; and
    a control arrangement for controlling the semiconductor switches, wherein the first semiconductor switch, the first diode, the fifth semiconductor switch and the fifth diode reside in a first switching branch-specific semiconductor module, wherein the fourth semiconductor switch, the fourth diode, the sixth semiconductor switch and the sixth diode reside in a second switching branch-specific semiconductor module, and wherein the control arrangement is configured to perform at least one of:

control each semiconductor switch, when the converter operates as a rectifier, such that when a first current flows into the switching branch through the alternating current pole, said first current always flows through either the first diode or the fifth semiconductor switch, and such that when a second current flows out of the switching branch through the alternating current pole, said second current always flows through either the fourth diode or the sixth semiconductor switch; and control each semiconductor switch, when the converter operates as an inverter, such that when a first current flows into the switching branch through the alternating current pole, said first current always flows through either the sixth diode or the fourth semiconductor switch, and such that when a second current flows out of the switching branch through the alternating current pole, said second current always flows through either the fifth diode or the first semiconductor switch.

2. The switching branch for the three-level converter of claim 1, wherein the second semiconductor switch, the second diode, the third semiconductor switch and the third diode reside in a third switching branch-specific semiconductor module.

3. The switching branch for the three-level converter of claim 1, wherein the second semiconductor switch and the second diode reside in the first switching branch-specific semiconductor module; and the third semiconductor switch and the third diode reside in the second switching branch-specific semiconductor module.

4. A three-phase three-level converter, comprising:

three switching branches, wherein each switching branch includes:

a first semiconductor switch and a second semiconductor switch connected in series between a positive direct current pole and an alternating current pole of the switching branch;

a first diode connected in parallel to the first semiconductor switch, and a second diode connected in parallel to the second semiconductor switch;

a third semiconductor switch and a fourth semiconductor switch connected in series between a negative direct current pole and the alternating current pole of the switching branch;

a third diode connected in parallel to the third semiconductor switch, and a fourth diode connected in parallel to the fourth semiconductor switch;

a fifth semiconductor switch connected between a neutral direct current pole and a connection point between the first and second semiconductor switches;

a sixth semiconductor switch connected between the neutral direct current pole and a connection point between the third and fourth semiconductor switches;

a fifth diode connected in parallel to the fifth semiconductor switch, and a sixth diode connected in parallel to the sixth semiconductor switch; and a control arrangement for controlling the semiconductor switches, wherein the first semiconductor switch, the first diode, the fifth semiconductor switch and the fifth diode reside in a first switching branch-specific semiconductor module, wherein the fourth semiconductor switch, the fourth diode, the sixth semiconductor switch and the sixth diode reside in a second switching branch-specific semiconductor module, and wherein the control arrangement is configured to perform at least one of:

control each semiconductor switch, when the converter operates as a rectifier, such that when a first current flows into the switching branch through the alternating current pole, said first current always flows through either the first diode or the fifth semiconductor switch, and such that when a second current flows out of the switching branch through the alternating current pole, said second current always flows through either the fourth diode or the sixth semiconductor switch; and control each semiconductor switch, when the converter operates as an inverter, such that when a first current flows into the switching branch through the alternating current pole, said first current always flows through either the sixth diode or the fourth semiconductor switch, and such that when a second current flows out of the switching branch through the alternating current pole, said second current always flows through either the fifth diode or the first semiconductor switch.

5. The converter of claim 4, wherein positive direct current poles of each switching branch are connected together, negative direct current poles of each switching branch are connected together and neutral direct current poles of each switching branch are connected together.

6. A method for controlling a switching branch of a three-level converter, the switching branch comprising:

a first semiconductor switch and a second semiconductor switch connected in series between a positive direct current pole and an alternating current pole of the switching branch;

a first diode connected in parallel to the first semiconductor switch, and a second diode connected in parallel to the second semiconductor switch;

a third semiconductor switch and a fourth semiconductor switch connected in series between a negative direct current pole and the alternating current pole of the switching branch;

a third diode connected in parallel to the third semiconductor switch, and a fourth diode connected in parallel to the fourth semiconductor switch;

a fifth semiconductor switch connected between a neutral direct current pole and a connection point between the first and second semiconductor switches;

a sixth semiconductor switch connected between the neutral direct current pole and a connection point between the third and fourth semiconductor switches; and a fifth diode connected in parallel to the fifth semiconductor switch, and a sixth diode connected in parallel to the sixth semiconductor switch, wherein the first semiconductor switch, the first diode, the fifth semiconductor switch and the fifth diode reside in a first switching branch-specific semiconductor module; and wherein the fourth semiconductor switch, the fourth diode, the sixth semiconductor switch and the sixth diode reside in a second switching branch-specific semiconductor module, the method comprising:

controlling each semiconductor switch, when the converter operates as a rectifier, such that when a first current flows into the switching branch through the alternating current pole, said first current always flows through either the first diode or the fifth semiconductor switch, and such that when a second current flows out of the switching branch through the alternating current pole, said second current always flows through either the fourth diode or the sixth semiconductor switch.

7. The method of claim 6, wherein the second semiconductor switch, the second diode, the third semiconductor switch and the third diode reside in a third switching branch-specific semiconductor module.

8. The method of claim 6, wherein
the second semiconductor switch and the second diode reside in the first switching branch-specific semiconductor module; and
the third semiconductor switch and the third diode reside in the second switching branch-specific semiconductor module.

9. A computer program product comprising computer program code recorded on a non-transitory computer readable medium, wherein when the computer readable medium is in a computer execution of the program code causes the computer to carry out the steps of a method for controlling a switching branch of a three-level converter, the switching branch comprising:
a first semiconductor switch and a second semiconductor switch connected in series between a positive direct current pole and an alternating current pole of the switching branch;
a first diode connected in parallel to the first semiconductor switch, and a second diode connected in parallel to the second semiconductor switch;
a third semiconductor switch and a fourth semiconductor switch connected in series between a negative direct current pole and the alternating current pole of the switching branch;
a third diode connected in parallel to the third semiconductor switch, and a fourth diode connected in parallel to the fourth semiconductor switch;
a fifth semiconductor switch connected between a neutral direct current pole and a connection point between the first and second semiconductor switches;
a sixth semiconductor switch connected between the neutral direct current pole and a connection point between the third and fourth semiconductor switches; and
a fifth diode connected in parallel to the fifth semiconductor switch, and a sixth diode connected in parallel to the sixth semiconductor switch,
wherein the first semiconductor switch, the first diode, the fifth semiconductor switch and the fifth diode reside in a first switching branch-specific semiconductor module; and
wherein the fourth semiconductor switch, the fourth diode, the sixth semiconductor switch and the sixth diode reside in a second switching branch-specific semiconductor module, the method comprising:
controlling each semiconductor switch, when the converter operates as a rectifier, such that when a first current flows into the switching branch through the alternating current pole, said first current always flows through either the first diode or the fifth semiconductor switch, and such that when a second current flows out of the switching branch through the alternating current pole, said second current always flows through either the fourth diode or the sixth semiconductor switch.

10. A method for controlling a switching branch of a three-level converter, the switching branch comprising:
a first semiconductor switch and a second semiconductor switch connected in series between a positive direct current pole and an alternating current pole of the switching branch;
a first diode connected in parallel to the first semiconductor switch, and a second diode connected in parallel to the second semiconductor switch;
a third semiconductor switch and a fourth semiconductor switch connected in series between a negative direct current pole and the alternating current pole of the switching branch;
a third diode connected in parallel to the third semiconductor switch, and a fourth diode connected in parallel to the fourth semiconductor switch;
a fifth semiconductor switch connected between a neutral direct current pole and a connection point between the first and second semiconductor switches;
a sixth semiconductor switch connected between the neutral direct current pole and a connection point between the third and fourth semiconductor switches; and
a fifth diode connected in parallel to the fifth semiconductor switch, and a sixth diode connected in parallel to the sixth semiconductor switch,
wherein the first semiconductor switch, the first diode, the fifth semiconductor switch and the fifth diode reside in a first switching branch-specific semiconductor module; and
wherein the fourth semiconductor switch, the fourth diode, the sixth semiconductor switch and the sixth diode reside in a second switching branch-specific semiconductor module, the method comprising:
controlling the semiconductor switches, when the converter operates as an inverter, such that when a first current flows into the switching branch through the alternating current pole, said first current flows through either the sixth diode or the fourth semiconductor switch, and such that when a second current flows out of the switching branch through the alternating current pole, said second current flows through either the fifth diode or the first semiconductor switch.

* * * * *